(12) United States Patent
Thomsen

(10) Patent No.: US 7,646,617 B2
(45) Date of Patent: Jan. 12, 2010

(54) METHOD FOR CONTROLLING A DIRECT VOLTAGE SOURCE AND A VOLTAGE SUPPLY DEVICE

(75) Inventor: Rune Thomsen, Loegumkloster (DK)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 11/370,677

(22) Filed: Mar. 8, 2006

(65) Prior Publication Data

US 2006/0202558 A1 Sep. 14, 2006

(30) Foreign Application Priority Data

Mar. 10, 2005 (DE) .................. 10 2005 011 519

(51) Int. Cl.
*H02J 3/36* (2006.01)
*H02J 1/10* (2006.01)
*H02J 1/00* (2006.01)

(52) U.S. Cl. .................. 363/35; 307/43; 307/86
(58) Field of Classification Search .......... 307/4, 307/10.1, 43, 44, 75, 76, 78, 86, 80; 323/252, 323/266, 268; 361/77, 90, 91, 93.1
See application file for complete search history.

(56) References Cited

U.S. PATENT DOCUMENTS

| | | | | |
|---|---|---|---|---|
| 4,713,740 A | 12/1987 | Drabing | ................. | 363/17 |
| 4,736,264 A | 4/1988 | Segger | ................. | 361/18 |
| 5,132,606 A * | 7/1992 | Herbert | ................. | 323/266 |
| 5,278,453 A | 1/1994 | Pollmeier | ................. | 307/44 |
| 5,506,775 A * | 4/1996 | Tsurushima et al. | .......... | 701/45 |
| 5,585,760 A | 12/1996 | Byford et al. | ................. | 327/545 |
| 6,051,955 A * | 4/2000 | Saeki et al. | ................. | 320/121 |
| 6,268,665 B1 * | 7/2001 | Bobry | ................. | 307/66 |
| 6,700,807 B1 * | 3/2004 | Williams et al. | ................. | 363/95 |
| 6,775,164 B2 * | 8/2004 | Wong et al. | ................. | 363/147 |
| 7,089,435 B2 * | 8/2006 | Kawakubo | ................. | 713/300 |
| 2002/0039270 A1 * | 4/2002 | Sato | ................. | 361/93.1 |
| 2004/0145843 A1 * | 7/2004 | Winick et al. | ................. | 361/90 |

FOREIGN PATENT DOCUMENTS

| | | |
|---|---|---|
| DE | 38 16 944 | 11/1989 |
| EP | 0 203 444 | 8/1989 |
| EP | 0 584 623 | 2/1994 |

OTHER PUBLICATIONS

Brochure No. L6598 entitled "High Voltage Resonant Controller", dated Jun. 2004, pp. 1-17.

* cited by examiner

*Primary Examiner*—Edward Tso
*Assistant Examiner*—M'Baye Diao
(74) *Attorney, Agent, or Firm*—McCormick, Paulding & Huber LLP

(57) ABSTRACT

The invention concerns a method for controlling a direct voltage source with a first direct voltage source (2) and a voltage monitoring device (24), which monitors an output voltage of the first direct voltage source (2) and acts upon a control device (31), the control device (31) controlling the working state of the first direct voltage source (2). Further, the invention concerns a voltage supply device (22) with which the method can be used. In this connection it is endeavored to reduce the risk of an increase in voltage in a circuit with several direct voltage sources. For this purpose, a second direct voltage source (3) produces a voltage change at the voltage monitoring device (24).

17 Claims, 2 Drawing Sheets

METHOD FOR CONTROLLING A DIRECT VOLTAGE SOURCE AND A VOLTAGE SUPPLY DEVICE

CROSS-REFERENCE TO RELATED APPLICATIONS

Applicant hereby claims foreign priority benefits under U.S.C. § 119 from German Patent Application No. 10 2005 011 519.5 filed on Mar. 10, 2005, the contents of which are incorporated by reference herein.

FIELD OF THE INVENTION

The invention concerns a method for controlling a direct voltage source with a first direct voltage source and a voltage monitoring device, which monitors an output voltage of the first direct voltage source and acts upon a control device, the control device controlling the working state of the first direct voltage source. Further, the invention concerns a voltage supply device with a first voltage source and a voltage monitoring device, which monitors an output voltage of the first direct voltage source and acts upon a control device, the control device being connected to the first direct voltage source.

BACKGROUND OF THE INVENTION

Direct voltage is particularly useful for direct current consumers, which are supplied independently of public energy supply mains. One advantage of the direct voltage is that it can be stored. Thus, for example, direct voltage consumers in vehicles are supplied by a direct voltage, which has in advance been stored in a battery. Direct voltage consumers are, for example, compressors for air conditioning systems or refrigeration units. Often, for security reasons, such vehicles have several direct voltage sources, which can mutually influence each other. Further, with such vehicles, it is often possible to choose from different direct voltage sources, depending on whether the vehicle is in motion or is parked. The use of a direct voltage source may cause increases in voltage, which involve the risk that the connected consumers, electrical components or the direct voltage source itself can be overloaded or even damaged.

Increases in voltage are voltages whose intensity exceeds an anticipated value, for example exceeds a nominal voltage. In this connection, one distinguishes between temporary transient increases in voltage which, for example, occur because of switching operations and increases in voltage which are caused by an incorrect function. In the present case, increases in voltage which are caused by an error are considered more thoroughly. The first step required to avoid such increases in voltage is the detection of the increase in voltage. For this purpose, circuit arrangements are known, with which an increase in voltage can be detected. Increases in voltage are particularly dangerous to semiconductor components.

U.S. Pat. No. 4,713,740 describes a method and a device, in which a direct voltage of a direct voltage source is monitored. An upward or a downward deviation of the direct voltage in relation to a preset value will initiate measures to prevent malfunctions.

Circuits for monitoring the voltage from direct voltage sources are also known from the data sheet of the high voltage resonance controller L 6598 of ST Microelectronics. Here a voltage monitoring by means of diodes and ohmic resistors is performed to protect semiconductor components of the high voltage resonance controller.

BRIEF SUMMARY OF THE INVENTION

The invention is based on the task of providing a method and a device, which ensure a simple manner of reducing the risk of an increase in voltage in a circuit device with several direct voltage sources.

With a method as mentioned in the introduction, this task is solved in that a second direct voltage source produces a voltage change at the voltage monitoring device.

Initially, a voltage monitoring takes place at the first direct voltage source. Now, the available voltage monitoring device is also used for monitoring the second voltage monitoring source. To ensure that the common voltage monitoring device will in fact recognise a malfunction, that is, an increase in voltage at the second direct voltage source, this voltage increase is passed on to the voltage monitoring device of the first direct voltage monitoring device, where it initiates a voltage change. Now, the voltage monitoring device has two functions. It monitors the output voltage of the first direct voltage source. Additionally, the voltage monitoring device indirectly also monitors the output voltage of the second direct voltage source. If, for example, the second output voltage or a share of the second output voltage overlaps the first output voltage, the monitored voltage at the voltage monitoring device changes. Thus, with only one voltage monitoring device, voltage changes are determined, which are produced either by only the first, only the second or by both direct voltage sources at the same time. When both voltage sources are working correctly, increases in voltage cannot be established. In this connection, voltage changes are recognised by the voltage monitoring device without delay, so that the control device can take action in the case of a malfunction of a direct voltage source.

It is particularly preferred that the second direct voltage source increases the output voltage of the first direct voltage source. An increase in voltage occurs, for example, by adding the output voltage of the first direct voltage source and the output voltage of the second direct voltage source. With only one measurement, it is particularly simple to determine an increase in voltage. Several measurements on the individual direct voltage sources can be avoided. An increase in voltage at the voltage monitoring device occurs, for example, when a positive voltage at the first direct voltage source is superimposed upon an equally positive voltage of the second direct voltage source. This means that rectified voltages were added to a larger voltage, which was recognised as an increase in voltage. It is also possible that only a share of the output voltage of the second direct voltage source overlaps the output voltage of the first direct voltage source. Thus, also a voltage divider can be used.

Preferably, the control device is supplied from an auxiliary supply device, the size of a supply voltage of the auxiliary supply device being reduced, when the voltage monitoring device detects a voltage change. For example, an increase in voltage at the voltage monitoring device initiates a voltage dip, that is, a reduction of the nominal voltage of the auxiliary supply device. A voltage dip can then be used for controlling further electronic components.

Advantageously, the auxiliary supply device delivers a supply current, which increases, when the voltage monitoring device determines a voltage change. The output of the auxiliary supply device is limited, so that either the supply current or the supply voltage can increase. When the connected load is increased, also the supply current is increased, so that at the same time the supply voltage is reduced. Thus, on the one hand more current can be supplied and on the other hand a reduced supply voltage can be made available. Both changes can be used for a control.

Preferably, the supply current of the auxiliary supply device increases proportionally with the voltage change at the voltage monitoring device. The proportional relation can be used as a standard for the value of the measured voltage increase or voltage decrease. Due to the proportional relation, a malfunction of a direct voltage source can be assessed.

Preferably, the control device turns off the first direct voltage source at a voltage change. This is particularly advantageous, when the voltage change is a determined voltage increase, as in this case the risk of damaging the circuit is large.

It is ensured that the second direct voltage source takes over a supply of a consumer without stopping, when the first direct voltage source is turned off. In this manner, a continuous supply of the consumer is ensured without stopping. The consumer does not realise, which of the two direct voltage sources is currently active.

Preferably, the first direct voltage source and the second voltage source are connected through a field-effect-transistor, which assumes a conducting state, when an increase in voltage is determined at the voltage monitoring device. A field-effect-transistor is a low-power, controllable component, which functions as a switch and is in a conducting or a blocking state depending upon the voltage values at its connections. Thus, in a simple manner the field-effect-transistor can connect or disconnect the two direct voltage sources.

The task is solved with a voltage supply device as mentioned in the introduction, in that a second direct voltage source is connected to the voltage monitoring device.

A connection of the first direct voltage source with the second direct voltage source enables the voltage monitoring device to monitor an output voltage of the second direct voltage source at the same time. In a practical manner, the voltage monitoring device is located in parallel between a positive and a negative connection of the first direct voltage source. Also the second direct voltage source can then be connected in parallel with the voltage monitoring device, so that the state of the first and of the second direct voltage source can be monitored at the same time. It can also be imagined that further direct voltage sources can be connected in parallel with the voltage monitoring device in this manner.

Preferably, an output voltage of the second direct voltage source is higher than the output voltage of the first direct voltage source. In such a case, a malfunction of the second direct voltage source can easily be recognised, also when only a share of the output voltage is in contact with the voltage monitoring device. A shared voltage at the voltage monitoring device occurs, for example, through a voltage divider, which acts upon the second direct voltage source.

In a practical embodiment, the second direct voltage source is connected in series with a protection element. The protection element can be used for protecting the second direct voltage source from reverse voltages or further excess voltages, which could, for example, be generated by a generator connected to the second direct voltage source. The protection element can also be used for protection against an overloading of the second direct voltage source, for example as part of a charge controller.

Preferably, the protection element is a field-effect-transistor, which has an internal protection diode. A field-effect-transistor, which is connected to a terminal of the second direct voltage source, can also in a simple manner prevent reverse voltages during the installation of the second direct voltage source. A field-effect-transistor is also suited for connecting or disconnecting paths inside the electrical device.

Preferably, a terminal of the field-effect-transistor is connected to a control connection of the first direct voltage source. The control connection of the first direct voltage source can thus act upon the field-effect-transistor, which again is connected to the second direct voltage source. By means of the field-effect-transistor it is possible to determine if the first direct voltage source is connected. If the first direct voltage source is available, a defined voltage can be applied to the control connection, which controls the state of the field-effect-transistor in step with the operation mode of the first direct voltage source.

It is ensured that an ohmic resistor is connected between a gate terminal of the field-effect-transistor and a positive pole of the second direct voltage source. The ohmic resistor is, for example, part of a voltage divider, when the field-effect-transistor is in a blocking state. When the field-effect-transistor is conducting, the ohmic resistor prevents a short-circuiting of the positive and negative connections of the second direct voltage source.

Advantageously, a diode is located between the gate terminal of the field-effect-transistor and a first reference potential of the device. The diode is blocking in the direction of the first reference potential and conducting in the opposite direction. It can be a Zener-diode, which, in the blocked state, produces a voltage drop at the field-effect-transistor, for example between the gate terminal and a source terminal. It thus influences the operating state of the field-effect-transistor.

It is preferred that the voltage monitoring device is connected to the control device via an optical coupling device. An optical coupling device is, for example, an optocoupler with a light emitting diode and a transistor, which transmits a signal of a circuit to a further circuit, thus creating a galvanic separation. The galvanic separation occurs via the optical path. Thus, it is also possible to use different reference potentials in the individual circuits.

In an advantageous manner, a supply current of the auxiliary energy supply device is available for the optical coupling device. It is expedient to galvanically separate a circuit with an auxiliary energy supply device from further circuits. The optical coupling device converts current, for example through a light emitting diode into a light signal, which is then again converted to a current by a transistor. This current is supplied by the auxiliary energy supply device in such a manner that a current flow appears. The current flow can then be used for the control of further components.

BRIEF DESCRIPTION OF THE DRAWINGS

In the following, the invention is described on the basis of preferred embodiments in connection with the drawings, showing.

DETAILED DESCRIPTION OF THE INVENTION

Figure 1:
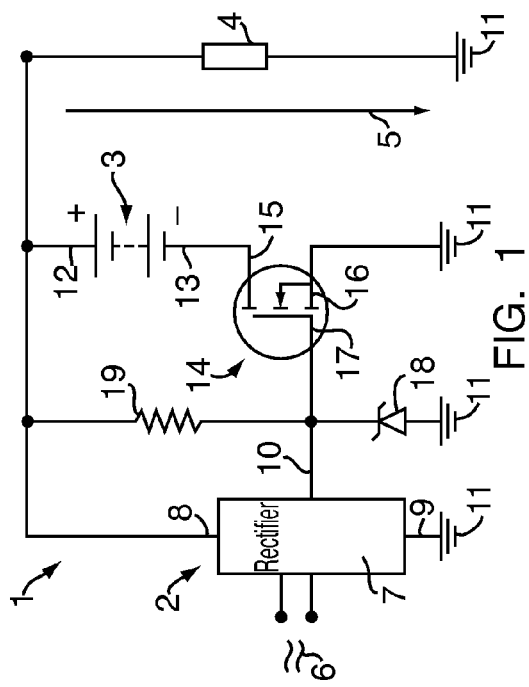
FIG. 1 is a schematic view of a device for providing a direct voltage, with two direct voltage sources and a connected consumer.

FIG. 1 shows a device 1 for controlling a direct voltage source with a first direct voltage source 2 and a second direct voltage source 3, supplying a common consumer 4 with a consumer direct voltage 5. In the present application, the first direct voltage source 2 is only available occasionally. The second direct voltage source 3, however, is always available for the supply of the consumer 4 whilst the vehicle is in motion. The vehicle can be a surface vehicle, for example a mobile home, or a vessel, for example a boat.

Sometimes, however, only one of the two direct voltage sources will be operated at a time. When, for example, the vehicle is parked, the supply from the first direct voltage source 2 is preferred. When the vehicle is in motion, the first direct voltage source 2 is usually not available, so that only the second direct voltage source 3 supplies the consumer 4 in connection with a generator.

The first direct voltage source 2 is connected to an alternating voltage source as external energy supply 6. The first direct voltage source 2 has a rectifier 7 for rectifying the alternating voltage of the external energy supply 6 and supplying it as direct voltage to a connection arrangement with a positive connection 8 and a negative connection 9. The first direct voltage source 2 has a third connection, which serves as control connection 10 and provides a defined voltage value. The negative connection 9 is connected to a first reference potential 11 of the arrangement 1. The positive connection 8 of the direct voltage source 2 is connected to a positive connection 12 of the second direct voltage source 3. The second voltage source 3 here exists in the form of an accumulator, whose negative connection 13 is connected to a protection element. In this case, the protection element is a field-effect-transistor 14, which has a drain terminal 15, a source terminal 16 and a gate terminal 17. The negative connection 13 of the second direct voltage source 3 is connected to the drain terminal 15 of the field-effect-transistor 14. The source terminal 16 is connected to the first reference potential 11 of the device 1. The gate terminal 17 of the field-effect-transistor 14 is connected to the control connection 10 of the first direct voltage source 2.

A diode 18 is located between the first reference potential 11 and the gate terminal 17. Here, the diode 18 is a Zener-diode, which has a passage direction from the first reference potential 11 to the gate terminal 17, whereas in the opposite direction it blocks. At the gate terminal 17, which is at the same time connected to the control connection 10, is connected an ohmic resistor 19, which is connected to the positive connection 8 of the first direct voltage source 2 and the positive connection 12 of the second direct voltage source 3.

The consumer 4 is, for example, a refrigerant compressor in a vehicle, which is continuously, that is, without stopping, supplied with a direct consumer voltage 5, either from the first direct voltage source 2 or from the second direct voltage source. If the first direct voltage source 2 is available to the vehicle, for example at an energy charging station, the second direct voltage source 3 is not in use. It is neither charged nor discharged.

In the case of malfunctions, the first direct voltage source 2 generates an output voltage of 27 V. The output voltage of the second voltage source 3 amounts to 12 volts. Due to this potential difference between 12 volts and 27 volts, the lack of further measures would cause a charging equalising of the first direct voltage source 2 in relation to the second parallel-connected voltage source 3. However, this is prevented by the field-effect-transistor 14, which is, for example, of the type 2804 from International Rectifier. As soon as an external energy source 6 is available, that is, as soon as a direct voltage of the first direct voltage source 2 is available at the connections 8, 9, the potential of the control connection 10 is held at zero volts, so that the gate terminal 17 of the field-effect-transistor 14 also assumes a potential of zero volts. Between the drain terminal 15 and the gate terminal 17 a residual voltage of about 15 volts will exist. This keeps the field-effect-transistor 14 in its off state, and a current flow from the drain terminal to the first reference potential 11 is not possible. This means that at this moment the second direct voltage source 3 is not in use. In this operational mode of the device 1, the consumer 4 is supplied with a constant direct voltage from the first direct voltage source 2.

The field-effect-transistor 14 has one further function. It prevents a malfunction of the device 1, when the second direct voltage source 3 is installed the wrong way round, that is, when its positive connection 12 is connected to the drain terminal 15 of the field-effect-transistor and its negative connection 13 is connected to the positive connection 8 of the first direct voltage source 2. In this case, the circuit of the field-effect-transistor 14 keeps it in its off state.

Figure 2:
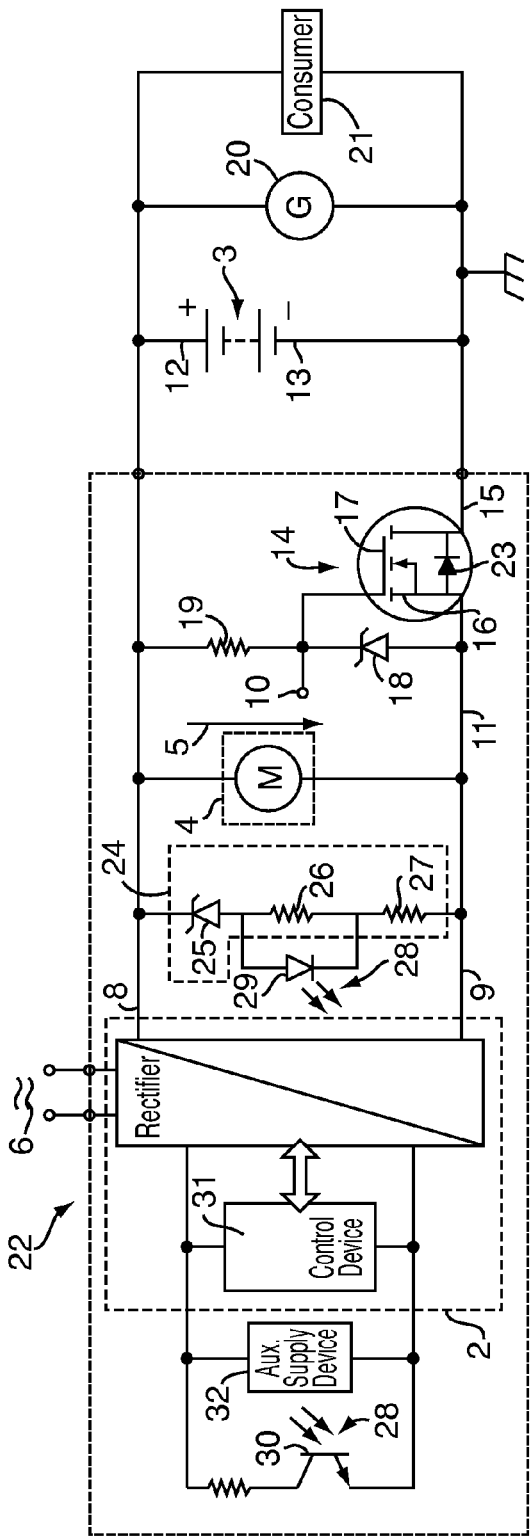
FIG. 2 is a schematic view of an arrangement with the device shown in FIG. 1, a voltage monitoring device at the first direct voltage source and a control device.

In FIG. 2, the device 1 shown in FIG. 1 is integrated in a voltage supply arrangement 22, which is used for controlling the first direct voltage source 2. It may happen that the second direct voltage source 3 has a higher output voltage than the first direct voltage source. This, for example, happens, when a vehicle generator 20, which usually recharges the second direct voltage source 3 whilst the vehicle is in motion, supplies the direct voltage source 3 with energy, even though it has already been fully charged. Also further consumers 21 can contribute to the second direct voltage source 3 assuming a higher direct voltage value as output voltage than the first direct voltage source 2. In such a case, the field-effect-transistor 14 blocks properly in the presence of the first direct voltage source. However, a current flows through a protection diode 23 inside the field-effect-transistor 14, to protect the field-effect-transistor against a too high voltage. However, due to its resistance, the current through the protection diode 23 produces a power loss. This power loss is released in the form of heat, which is usually transferred to the environment via heat sinks. In the present arrangement 22, this power loss is reduced, as the output voltage of the first direct voltage source 2 is limited to a lower voltage value or to zero volts.

In the present case, an increase in voltage is considered to be a voltage change caused by a malfunction, the second direct voltage source having an output voltage of, for example, 31 volts. At the second direct voltage source 3, the second voltage source 3 itself produces an increase in voltage at a voltage monitoring device 24. The voltage monitoring device 24 has a series connection with a diode 25, here a Zener-diode, and ohmic resistors 26, 27. An optocoupler 28, which has a light emitting diode 29 and a transistor 30, separates the voltage monitoring device from a control device 31. In this connection, the light emitting diode 29 of the optocoupler is connected in parallel with an ohmic resistor 26, which is part of the voltage monitoring device 24. The higher the current through the light emitting diode 29, the stronger the light emission power of the light emitting diode 29, and the higher the current in the transistor 30. The transistor 30 is supplied with a supply current from an auxiliary supply device 32 connected in parallel with the transistor 30. The auxiliary supply device 32 supplies a limited supply current. If more current is required by the transistor 30 than can be supplied by the auxiliary supply device 32, the auxiliary supply device 32 is overloaded and reduces the voltage supplied at its output connections.

The auxiliary current supply device 32 additionally supplies the parallel connected control device 31. Due to the overloading of the auxiliary supply device 32, a reduced voltage is also available for the control device 31. The control device 31 has integrated circuits, which are connected to the rectifier 7 of the first direct voltage source 2. The reduced supply voltage thus acts upon the integrated circuits and also upon the rectifier 7. If, in the present case, an auxiliary supply voltage of less than 8.5 volts is present at the connections of the auxiliary supply device 32, the integrated circuits disconnect the rectifier 7. When the rectifier 7 is disconnected, a direct voltage is no longer produced in the first direct voltage source, so that the first direct voltage source is not functioning. Consequently, the field-effect-transistor 14 is switched on, and the protection diode 23 of the field-effect-transistor 14 is de-energized. The first direct voltage source 2 is thus disconnected and the consumer 4, here the compressor of the vehicle, is supplied from the second direct voltage source.

Disconnecting the first direct voltage source 2 occurs so that no supply interruption occurs for the consumer 4. The control of the integrated circuit is dimensioned so that the reduction and the following disconnection of the rectifier 7 takes place in a controlled manner. An overloading of the field-effect-transistor 14 and other components caused by too high current or too high voltage is avoided.

When the output voltage of the second direct voltage source 3 again assumes a value below 27 volts, the current through the light emitting diode of the optocoupler is reduced, the auxiliary supply device 32 is less overloaded, or not overloaded at all, and the integrated circuits reactivate the rectifier 7. In this way, the first direct voltage source 2 again takes over the supply of the consumer 4. The field-effect-transistor 14 is again reversed to the disconnected state, so that the second direct voltage source 3 is not used. The stored energy of the second direct voltage source 3 is thus not made available for the operation of the vehicle again, until the first direct voltage source 2 is no longer available, that is, the vehicle is, for example, in motion.

Figure 3:
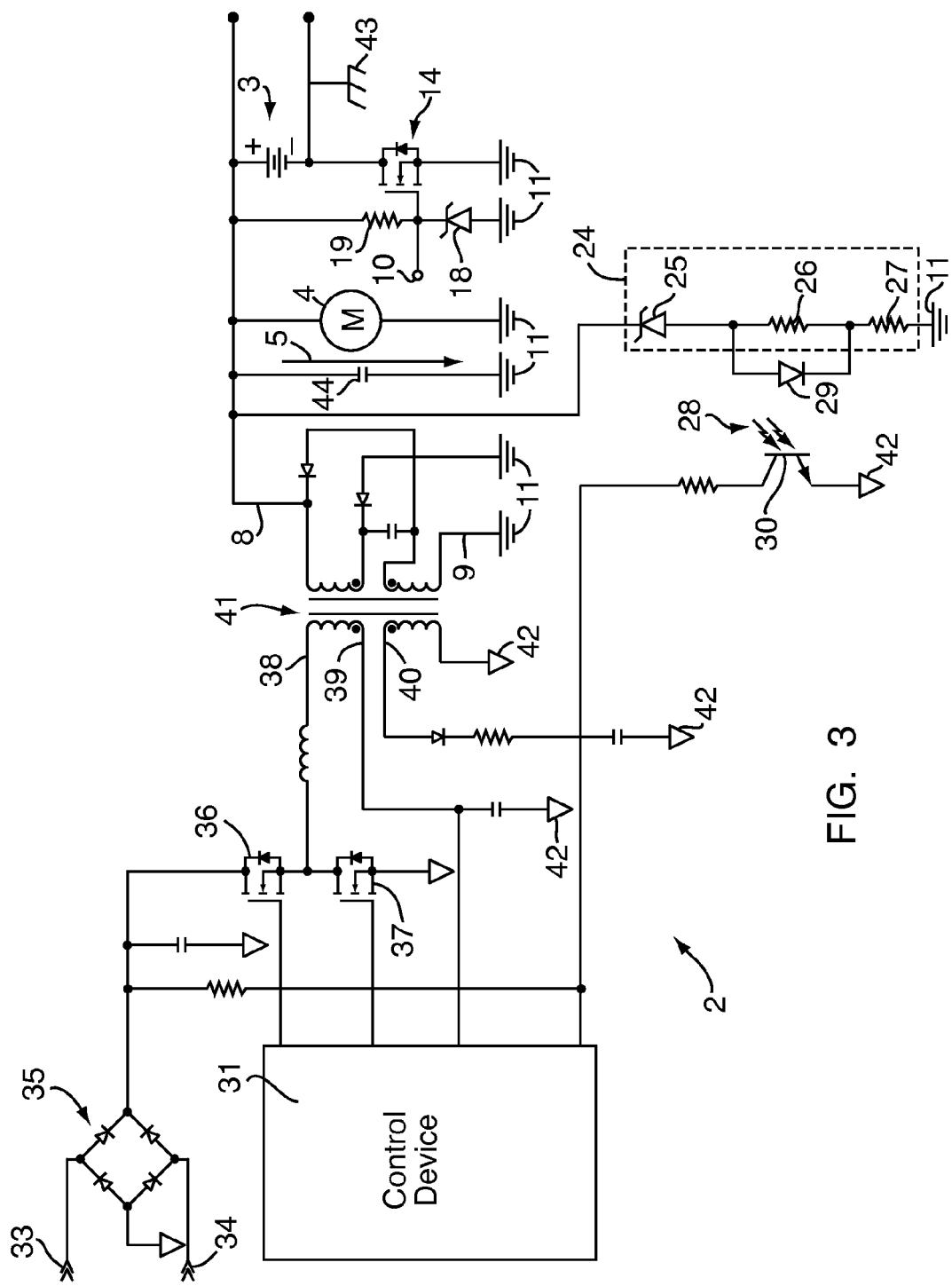
FIG. 3 is a schematic view of the arrangement in FIG. 2, with further components of the first direct voltage source.

FIG. 3 shows a further schematic view of the device 22 from FIG. 2 with further components of the first direct voltage source 2. At the connections 33 and 34 of the rectifier 7 an alternating voltage of the external energy supply is available. This alternating voltage is rectified by means of a rectifying bridge 35. The control device 31 with the integrated circuits and the rectifying bridge 35 are connected to each other by means of switches 36, 37, and are connected to the connections 38, 39, 40 of a transformer 41. The transformer 41 has two input windings and two output windings, and galvanically separates the connections 38, 39, 40 and a second reference potential 42 from the first 11 and a third reference potential 43 of the device 22. The third reference potential 43 is for example formed by a vehicle frame. A capacitor 44 at the outlet of the transformer 41 prevents brief voltage dips.

Of course, it is also possible that during the anticipated operation, the described voltage supply device 22 is driven with a correctly installed second direct voltage source 3, whose positive connection 12 is connected to the protection element 14. Accordingly, the connections 8, 9 of the first direct voltage source 2 are interchanged. Thus, the first reference potential 11 can be maintained and consequently assumes a positive potential. It is also possible that the voltage supply device 22 receives a new reference potential at the negative connections 9, 13 of the first and the second direct voltage sources 2, 3. With such a modified voltage supply device 22, the blocking and passing functions of the diodes 18, 25, 29 and of the field-effect-transistor 14 or another protection element, have to be adapted to the changed polarity. This can, for example, take place by means of an interchanging of the connections of these electrical components. It is also possible, in the case of a field-effect-transistor 14 as protection element, to use a different type of field-effect-transistor, which works as described above, however, with a changed polarity.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for controlling a direct voltage source with a first direct voltage source and a voltage monitoring device, which monitors a DC voltage at an output of the first direct voltage source and acts upon a control device, the control device controlling the working state of the first direct voltage source in response to a second direct voltage source producing a voltage change at the voltage monitoring device.

2. The method according to claim 1, wherein the second direct voltage source increases the voltage at the output of the first direct voltage source.

3. The method according to claim 1, wherein the control device is powered from an auxiliary supply device, the voltage supplied by the auxiliary supply device being reduced, when the voltage monitoring device detects a voltage change.

4. The method according to claim 3, wherein the auxiliary supply device delivers a supply current, which increases, when the voltage monitoring device detects a voltage change.

5. The method according to claim 4, wherein the supply current of the auxiliary supply device increases proportionally with the voltage increase at the voltage monitoring device.

6. The method according to claim 1, wherein the control device turns off the first direct voltage source when the second direct voltage source produces a voltage change at the voltage monitoring device.

7. The method according to claim 1, wherein the second direct voltage source takes over a supply of a consumer without stopping, when the first direct voltage source is turned off.

8. The method according to claim 1, wherein the first direct voltage source and the second direct voltage source are connected through a field-effect-transistor, which assumes a conducting state, when an increase in DC voltage is detected at the voltage monitoring device.

9. A supply device comprising;
 a first direct voltage source;
 a control device connected to and controlling the working state of the first direct voltage source;
 a voltage monitoring device, which monitors a DC voltage at the output of the first direct voltage source and acts upon the control device; and
 a second direct voltage source connected to the voltage monitoring device,
 wherein the control device is configured to adjust the first direct voltage source in response to the second direct voltage source producing a change in the DC voltage at the output of the first direct voltage source.

10. The supply device according to claim 9, wherein the control device is configured to turn off the first direct voltage source when an output voltage of the second direct voltage source is higher than the output voltage of the first direct voltage source.

11. The supply device according to claim 9, wherein the second direct voltage source is connected in series with a protection element.

12. The supply device according to claim 11, wherein the protection element is a field-effect-transistor, which has an internal protection diode.

13. The supply device according to claim 11, wherein a terminal of the protection element is connected to a control connection of the first direct voltage source.

14. The supply device according to claim 12, wherein an ohmic resistor is connected between a gate terminal of the field-effect-transistor and a positive connection of the second direct voltage source.

15. The supply device according to claim 14, wherein a diode is located between the gate terminal of the field-effect-transistor and a first reference potential of the device.

16. The supply device according to claim 9, wherein the voltage monitoring device is connected to the control device via an optical coupling device.

17. The supply device according to claim 16, wherein a supply current of the auxiliary energy supply device is available for the optical coupling device.

* * * * *